Feb. 23, 1926.  1,574,605

F. CHARTIER

DRAG

Filed Feb. 25, 1925

WITNESS:

Frank Chartier
INVENTOR

BY Victor J. Evans
ATTORNEY

Patented Feb. 23, 1926.

1,574,605

UNITED STATES PATENT OFFICE.

FRANK CHARTIER, OF DULUTH, MINNESOTA.

DRAG.

Application filed February 25, 1925. Serial No. 11,581.

*To all whom it may concern:*

Be it known that I, FRANK CHARTIER, a citizen of the United States, residing at Duluth, in the county of St. Louis and State of Minnesota, have invented new and useful Improvements in Drags, of which the following is a specification.

This invention comprehends the provision of a circular drag which enables the latter to be used close to and around a tree, stump or post without catching in the latter, and is also constructed to free itself from stones, weeds, roots or the like, which tend to clog the drag as the said drag is capable of turning to leave the weeds or the like behind without stopping or interfering with the progress of the team.

Another object of the invention resides in providing a structure which allows the team and drag to be turned around without causing the chain traces to strike the legs of the animal which frequently happens and results in bad sores on the animal's legs.

The nature and advantages of the invention will be better understood when the following detailed description is read in connection with the accompanying drawings, the invention residing in the construction, combination and arrangement of parts as claimed.

In the drawing forming part of this application, like numerals of reference indicate similar parts in the several views, and wherein.

Figure 1:
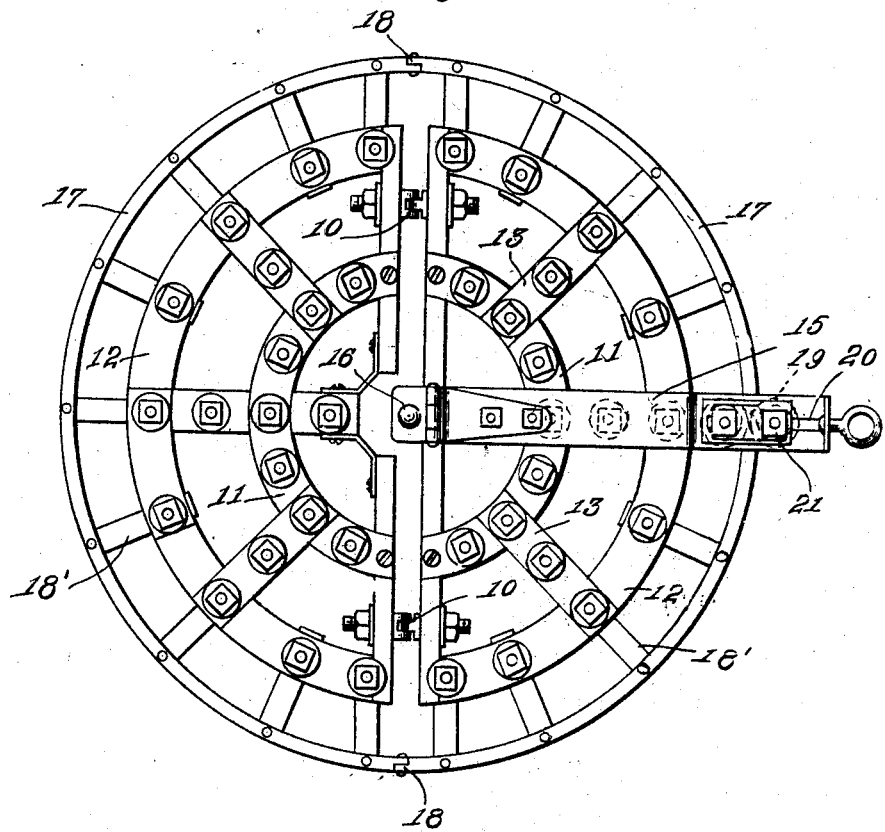
Figure 1 is a plan view of the drag.
Figure 2:
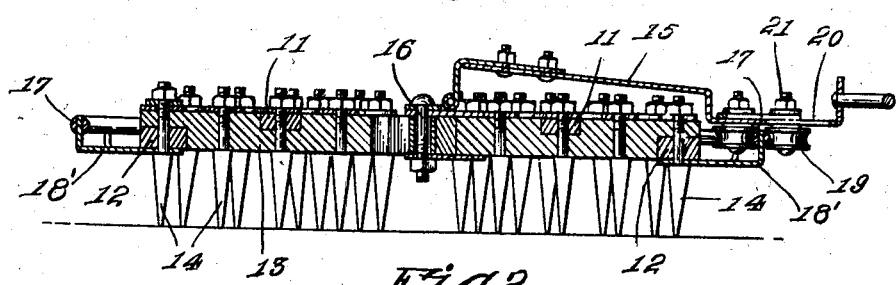
Figure 2 is a sectional view therethrough.

The drag forming the subject matter of the present invention is circular in contour as clearly illustrated in Figure 1, and is preferably made in two sections which are pivotally connected together as at 10, so that it can be advantageously used in small ravines or hills in the field, one section being capable of independent tilting movement with relation to the other. Each section includes inner and outer curved members 11 and 12 respectively which are connected by radially disposed pieces 13, and depending from these curved members and also from the radial pieces 13 are teeth 14. A draft bar 15 is pivoted as at 16 at a point approximately in the center of the drag, and this construction manifestly allows either the draft bar to be turned in any direction with relation to the drag, and also allows the drag to be turned on its pivot with relation to the draft bar. It is due to this construction that the advantages above outlined are accomplished. Surrounding the drag and spaced from the outer members 12 is a combined guard rail and track made up in two sections 17, the ends of which are pivotally connected together as at 18 in alignment with the pivots 10 of the respective sections, so that the guard rail 17 can be broken in alignment with the pivots 10 when one section is tilted with relation to the other. The guard rail is supported by brackets 18' arranged in a circumferential series and secured to the underside of the outer members 12 of the respective sections. The draft bar is spaced a slight distance above the drag to permit freedom of movement thereof, on the pivot 16, and carried by the said bar adjacent the outer end thereof is a pair of spaced pulleys 19 which engage the inner and outer periphery of the guard rail 17, to guide the draft bar in its movement. By reason of the construction shown and described, it is manifest that the drag can be worked close to a stump, post or tree without catching in the latter, and also worked around such obstructions without the latter interfering with the progress of the team attached thereto. In other words, the guard rail 17 will strike the object, and because of the fact that the drag is capable of turning on a pivot 16 it will whirl about, and accomplish its work without being checked by the post or the like. Then again due to this circular movement of the drag, the latter cannot become clogged with weeds, roots or bunches of grass, because when it gets overloaded with such matter it will make a complete circle leaving them behind. So that the team can continue to pull the drag over the ground or surface without being stopped or otherwise interfered with by stones or other objects above referred to. Furthermore, it is due to the fact that the drag and draft bar are pivotally connected at the center, that the drag can be turned around at any place in the field without the chain traces striking against the legs of the team which is a common occurrence with square drags, and usually results in bad sores on the legs of the animal. With the present invention the drag and team can be turned around without the chains coming in contact with the legs of the animal. Furthermore, one of the pulleys 19 is capable of adjustment toward and away from the other pulley through a slot 20 in that portion of the draft bar with which the pulleys are associated, the pulleys being maintained in proper working position by means of nuts 21.

The outside pulley is made adjustable as stated, and as clearly illustrated in the drawing, so that the draft bar can be lifted up from the drag when desired, and to compensate for wear of either of the pulleys or the drag. The invention will operate more efficiently when the pulleys are properly adjusted to allow the draft bar to slide along the track freely, for if too much play is allowed between the pulleys and the track, the draft bar will be very apt to pull away from the latter rendering the invention practically useless for the purpose intended. All of this however is overcome by having one of the pulleys mounted for adjustment toward and away from the track as shown.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

1. A circular drag comprising a pair of hingedly connected sections, teeth depending from each section, a circular guard rail surrounding the drag and spaced therefrom, and including pivotally connected sections, means for supporting the rail on the drag, and a draft bar having one end pivoted centrally of the drag.

2. A circular drag comprising a pair of hingedly connected sections, teeth depending from each section, the guard rail surrounding said drag and spaced therefrom, and including pivotally connected sections, means for supporting the guard rail on the drag, and a draft bar having one end pivoted centrally on said drag, and spaced pulleys carried by said bar and engaging the inner and outer periphery of said guard rail for guiding the bar in its movements as described.

3. A circular drag comprising a pair of hingedly connected sections, each section including inner and outer curved members, radially disposed strips connecting said members, teeth depending from the members and strips of each section, a guard rail surrounding the drag and spaced therefrom and including pivotally connected sections, a plurality of brackets including the guard rail on said drag, and a draft bar having one end pivoted centrally in said drag, and a pair of adjustable pulleys carried by said bar adjacent the outer end thereof and engaging the inner and outer periphery of said guard rail.

In testimony whereof I affix my signature.

FRANK CHARTIER.